United States Patent
Ensher et al.

(10) Patent No.: US 9,983,030 B2
(45) Date of Patent: May 29, 2018

(54) SYSTEM AND METHOD FOR SENSING MANY FIBER SENSORS USING TIME-DIVISION MULTIPLEXING AND WAVELENGTH DIVISION MULTIPLEXING

(71) Applicant: INSIGHT PHOTONIC SOLUTIONS, INC., Lafayette, CO (US)

(72) Inventors: Jason Ensher, Lafayette, CO (US); Michael Minneman, Lafayette, CO (US); Michael Crawford, Lafayette, CO (US)

(73) Assignee: INSIGHT PHOTONIC SOLUTIONS, INC., Lafayette, CO (US)

( * ) Notice: Subject to any disclaimer, the term of this patent is extended or adjusted under 35 U.S.C. 154(b) by 178 days.

(21) Appl. No.: 15/189,018

(22) Filed: Jun. 22, 2016

(65) Prior Publication Data

US 2016/0377456 A1    Dec. 29, 2016

Related U.S. Application Data

(60) Provisional application No. 62/184,954, filed on Jun. 26, 2015.

(51) Int. Cl.
  *G01D 5/353* (2006.01)
  *E21B 47/06* (2012.01)
  *G01V 8/24* (2006.01)

(52) U.S. Cl.
  CPC ....... *G01D 5/35387* (2013.01); *G01D 5/3538* (2013.01); *G01D 5/3539* (2013.01); *G01D 5/35316* (2013.01); *E21B 47/06* (2013.01); *G01V 8/24* (2013.01)

(58) Field of Classification Search
  CPC .............. G01D 5/353; G01D 5/35303; G01D 5/35306; G01D 5/35309; G01D 5/35312; G01D 5/35316; G01D 5/35319; G01D 5/35322; G01D 5/35325; G01D 5/35329; G01D 5/35332; G01D 5/35335; G01D 5/35338; G01D 5/35341; G01D 5/35345; G01D 5/35348; G01D 5/3535
  See application file for complete search history.

(56) References Cited

U.S. PATENT DOCUMENTS

2013/0148190 A1    6/2013    Taverner
2014/0340235 A1   11/2014    Taverner

FOREIGN PATENT DOCUMENTS

WO    2014/023770    2/2014

OTHER PUBLICATIONS

Extended European search report for corresponding Patent Application No. EP 16 17 6270 dated Nov. 21, 2016.

*Primary Examiner* — Renee Chavez
(74) *Attorney, Agent, or Firm* — Renner, Otto, Boisselle & Sklar, LLP

(57) ABSTRACT

A system and method for discriminately measuring the response of a plurality of spatially separated fiber sensors positioned along an optical fiber using a sweep of electromagnetic radiation. Each fiber sensor affects the transmission of a particular wavelength of electromagnetic radiation and the particular wavelength affected by a given fiber sensor is dependent on at least one environmental property of the given fiber sensor. By detecting the particular wavelength affected by a given sensor, it is possible to determine the environmental property of the given sensor.

20 Claims, 3 Drawing Sheets

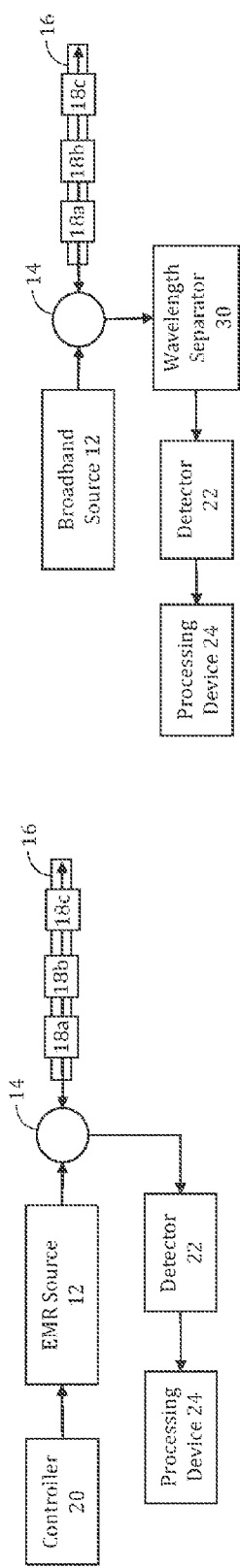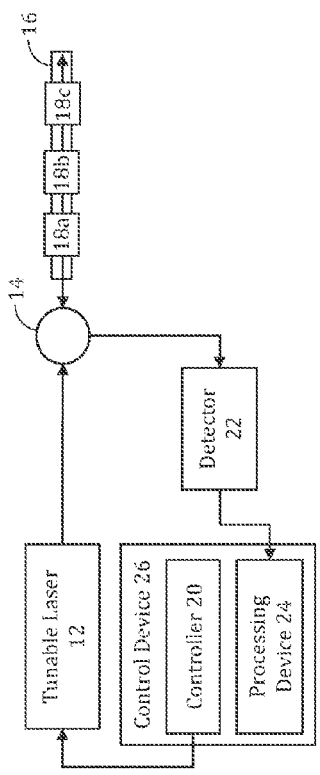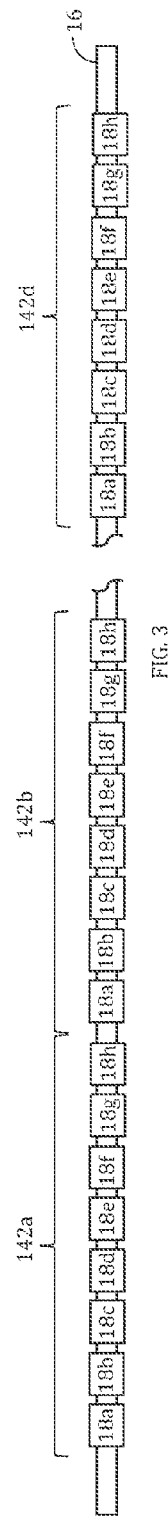

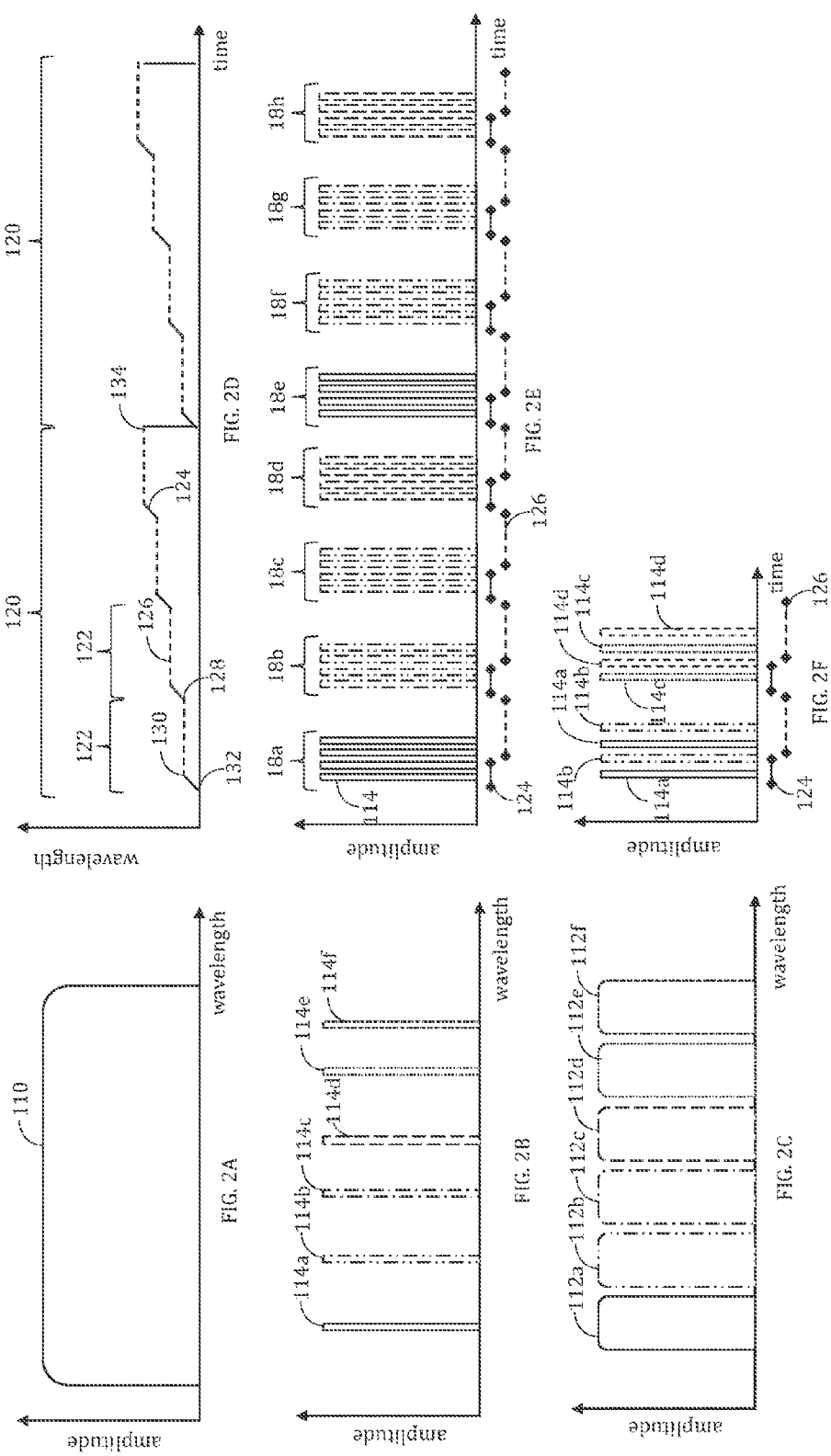

SYSTEM AND METHOD FOR SENSING MANY FIBER SENSORS USING TIME-DIVISION MULTIPLEXING AND WAVELENGTH DIVISION MULTIPLEXING

TECHNICAL FIELD

The present disclosure relates generally to fiber optic sensors and more particularly to a system and method for discriminately sensing multiple fiber sensors that are part of a fiber optic by using time-division multiplexing and wavelength division multiplexing.

BACKGROUND

Fiber optic sensing is used to measure environmental conditions (e.g., temperature, pressure, strain, etc.) at specific locations along an optical fiber. For example, fiber optic sensing is often used in structural monitoring and downhole oil and gas monitoring, where an optical fiber can be embedded in the casing of a well. In this example, fiber sensors located along an optical fiber are used to monitor changes in pressure on the casing.

SUMMARY

Discrete fiber optic sensing is limited in the number of fiber sensors that can be discriminately measured in a given length of fiber. Typically, discrete fiber optic sensors exhibit a wavelength-dependent response to a stimulus. As each fiber sensor may affect a given range of wavelengths, this possible range of effected wavelength limits the number of sensors that can fit into a spectral range of a light source.

For example, swept lasers commonly cover about a 80 nm spectral range. It is also common for certain fiber sensors (e.g., Fiber Bragg Gratings) to show up to +/−2 nm of wavelength change due to temperature, pressure, or strain changes. Hence, as each fiber sensor occupies a possible 4 nm range of wavelengths (i.e., +/−2 nm equates to a 4 nm range), it is possible to determine the output from approximately twenty sensors in a single sweep of a swept laser (i.e., 80 nm spectral range divided by 4 nm range of wavelengths for each fiber sensor allows for approximately twenty sensors). For this reason, the number of fiber sensors capable of being measured is limited by the wavelength range of the laser sweep and the possible wavelength change of each fiber sensor.

The limited number of fiber sensors capable of being discriminately measured is independent of the length of the optical fiber. The relatively small number of sensors capable of being discriminately measured reduces the spatial resolution of sensing systems. For example, in some applications, it may be desirable to use 1000 sensors over a distance of 10 km. However, current limitations may only allow twenty sensors over the 10 km distance.

A system and method is needed that enables many fiber sensors to be discriminately measured in a single optical fiber.

The present disclosure provides a system and method for discriminately measuring the response of a plurality of spatially separated fiber sensors positioned along an optical fiber using a sweep of electromagnetic radiation that includes repetitions of a combination of a subsweep followed by a period of time during which the output wavelength is maintained.

According to one aspect of the disclosure, there is provided a system for discriminately measuring the response of a plurality of spatially separated fiber sensors positioned along an optical fiber. The system includes an electromagnetic radiation source configured to emit electromagnetic radiation having a wavelength within an emission wavelength range. The emitted electromagnetic radiation is transmitted by the optical fiber. The system also includes an optical fiber including a plurality of fiber sensors. Each fiber sensor affects a transmission of a particular wavelength of the electromagnetic radiation transmitted by the optical fiber. For a given fiber sensor of the plurality of fiber sensors, the particular wavelength affected by the given fiber sensor is dependent on at least one environmental property of the given fiber sensor. The particular wavelength affected by the given fiber sensor is constrained within a defined subrange of the emission wavelength range. The system also includes a controller configured to control the electromagnetic radiation output by the electromagnetic radiation source, such that, at a given time, the electromagnetic radiation source outputs a specified wavelength of electromagnetic radiation. The specified wavelength is varied in time to produce an output sweep within the emission wavelength range. The output sweep includes at least two repetitions of a combination of a subsweep followed by a pause. Each of the repetitions begins at an initial wavelength and ends at an ending wavelength. Each subsweep comprises a sweep across a subrange of wavelengths beginning with the initial wavelength and ending at the ending wavelength. During each pause following the subsweep, the wavelength of the electromagnetic radiation output by the electromagnetic radiation source is maintained for a period of time at a pause wavelength. The initial wavelength differs for each repetition of the subsweep and the ending wavelength differs for each repetition of the subsweep. The system further includes a detector configured to detect wavelengths of the electromagnetic radiation effected by the fiber sensors. The detector is configured to record the detected effected wavelengths and a time at which each effected wavelength was detected.

Alternatively or additionally, the plurality of fiber sensors are fiber brag gratings (FBGs).

Alternatively or additionally, within a particular subsweep the pause wavelength is the ending wavelength of the particular subsweep.

Alternatively or additionally, the pause wavelength for each subsweep does not fall within the defined subrange of any of the fiber sensors.

Alternatively or additionally, the ending wavelength for a preceding subsweep that immediately precedes a following subsweep is the initial wavelength for the following subsweep.

Alternatively or additionally, the optical fiber is comprised of repeating sets of fiber sensors.

Alternatively or additionally, the defined subrange for each particular fiber sensor within a given set of the repeating sets of fiber sensors does not overlap with the defined subrange of any other fiber sensors within the given set.

Alternatively or additionally, the repeating sets of fiber sensors are equally spaced along the optical fiber. The period of time of the pause following each subsweep is greater than or equal to $2nL/c$, where n is the index of refraction of the optical fiber, c is the speed of light, and L is the distance between the beginning of a particular one of the repeating sets of fiber sensors to an adjacent one of the repeating sets of fiber sensors.

Alternatively or additionally, a sweep rate for each subsweep is greater than $(2 \cdot d\lambda\_sensor\_max + d\lambda\_sub)/Tsec$, where Tsec is the period of time of the pause, $d\lambda\_sensor\_max$ is the defined subrange, and $d\lambda\_sub$ is difference between the ending wavelength and the initial wavelength for each subsweep.

Alternatively or additionally, the output sweep begins at a starting wavelength and ends at a final wavelength. The output sweep is repeated at least once such that, following completion of the output sweep, the wavelength of the electromagnetic radiation output by the electromagnetic radiation source switches from the final wavelength to the starting wavelength.

Alternatively or additionally, the system further includes a processing device configured to determine the at least one environmental property of a selected fiber sensor of the plurality of sensors based on the particular wavelength affected by the selected fiber sensor.

Alternatively or additionally, the processing device is further configured to determine the particular wavelength effected by the selected fiber sensor based on known properties of the optical fiber including location of the plurality of fiber sensors, known properties of the fiber sensors, known properties of the output sweep, and the timing at which the detected effected wavelengths were detected.

Alternatively or additionally, the processing device is configured to determine the at least one environmental property of each of the plurality of sensors.

Alternatively or additionally, the at least one environmental property is at least one of temperature, pressure, strain, a presence of specific substances, or a concentration of particular substances.

Alternatively or additionally, the each fiber sensor affects the transmission of the particular wavelength by reflecting the particular wavelength.

Alternatively or additionally, the electromagnetic radiation source is a tunable laser.

According to another aspect of the disclosure, there is provided a method for discriminately measuring the response of a plurality of spatially separated fiber sensors positioned along an optical fiber. The method includes emitting electromagnetic radiation having a wavelength within an emission wavelength range, such that the emitted electromagnetic radiation is transmitted by the optical fiber. The method also includes affecting a transmission of at least one wavelength of the electromagnetic radiation transmitted by the optical fiber using the fibers sensors. Each fiber sensor affects a transmission of a particular wavelength of the electromagnetic radiation. For a given fiber sensor of the plurality of fiber sensors, the particular wavelength affected by the given fiber sensor is dependent on at least one environmental property of the given fiber sensor. The particular wavelength affected by the given fiber sensor is constrained within a defined subrange of the emission wavelength range. The method additionally includes controlling the emission of electromagnetic radiation, such that at a given time, a specified wavelength of electromagnetic radiation is emitted. The method further includes varying in time the specified wavelength to produce an output sweep within the emission wavelength range. The output sweep includes at least two repetitions of a combination of a subsweep followed by a pause. Each of the repetitions begins at an initial wavelength and ends at an ending wavelength. Each subsweep comprises a sweep across a subrange of wavelengths beginning with the initial wavelength and ending at the ending wavelength. During each pause following the subsweep, the wavelength of the electromagnetic radiation being emitted is maintained for a period of time at a pause wavelength. The initial wavelength differs for each repetition of the subsweep and the ending wavelength differs for each repetition of the subsweep. The method also includes detecting wavelengths of the electromagnetic radiation effected by the fiber sensors and recording the effected wavelengths and a time at which each effected wavelength was detected.

Alternatively or additionally, the method further includes determining the at least one environmental property of a selected fiber sensor of the plurality of sensors based on the particular wavelength affected by the selected fiber sensor.

Alternatively or additionally, the method also includes determining the particular wavelength effected by the selected fiber sensor based on known properties of the optical fiber including location of the plurality of fiber sensors, known properties of the fiber sensors, known properties of the output sweep, and the timing at which the detected effected wavelengths were detected.

According to a further aspect of the disclosure, there is provided a system for discriminately measuring the response of a plurality of spatially separated fiber sensors positioned along an optical fiber. The system includes an electromagnetic radiation source configured to emit electromagnetic radiation having a wavelength within an emission wavelength range. The emitted electromagnetic radiation is transmitted by the optical fiber. The system also includes the optical fiber including the plurality of fiber sensors. The optical fiber is comprised of repeating sets of fiber sensors. Each fiber sensor affects a transmission of a particular wavelength of the electromagnetic radiation transmitted by the optical fiber. For a given fiber sensor of the plurality of fiber sensors, the particular wavelength affected by the given fiber sensor is dependent on at least one environmental property of the given fiber sensor. The particular wavelength affected by the given fiber sensor is constrained within a defined subrange of the emission wavelength range. The defined subrange for each particular fiber sensor within a given set of the repeating sets of fiber sensors does not overlap with the defined subrange of any other fiber sensors within the given set. The system additionally includes a controller configured to control the electromagnetic radiation output by the electromagnetic radiation source, such that, at a given time, the electromagnetic radiation source outputs a specified wavelength of electromagnetic radiation. The specified wavelength is varied in time to produce an output sweep within the emission wavelength range. The output sweep includes at least two repetitions of a combination of a subsweep followed by a pause. Each of the repetitions begins at an initial wavelength and ends at an ending wavelength. Each subsweep comprises a sweep across a subrange of wavelengths beginning with the initial wavelength and ending at the ending wavelength. The ending wavelength for a preceding subsweep that immediately precedes a following subsweep is the initial wavelength for the following subsweep. During each pause following the subsweep, the wavelength of the electromagnetic radiation output by the electromagnetic radiation source is maintained for a period of time at a pause wavelength. Within a particular subsweep the pause wavelength is the ending wavelength of the particular subsweep. The pause wavelength for each subsweep does not fall within the defined subrange of any of the fiber sensors. The initial wavelength differs for each repetition of the subsweep and the ending wavelength differs for each repetition of the subsweep. The system further includes a detector configured to detect wavelengths of the electromagnetic radiation effected by the fiber sensors. The detector is configured to record the detected effected wavelengths and a time at which each effected wavelength was detected.

A number of features are described herein with respect to embodiments of the disclosure; it will be appreciated that features described with respect to a given embodiment also may be employed in connection with other embodiments.

The disclosure includes the features described herein, including the description, the annexed drawings, and, if appended, the claims, which set forth in detail certain illustrative embodiments. These embodiments are indicative, however, of but a few of the various ways in which the principles of the disclosure may be employed.

BRIEF DESCRIPTION OF THE DRAWINGS

FIGS. 1A-1C are representations of exemplary systems for discriminately measuring the response of a plurality of spatially separated fiber sensors positioned along an optical fiber.

FIG. 2A illustrates an emission wavelength range for an electromagnetic radiation source.

FIG. 2B illustrates exemplary defined subranges (i.e., the range of possible wavelengths effected) for a plurality of fiber sensors.

FIG. 2C illustrates exemplary particular wavelengths affected by a plurality of fiber sensors.

FIG. 2D illustrates an exemplary output sweep.

FIGS. 2E and 2F illustrate exemplary particular wavelengths affected by a plurality of fiber sensors for an output sweep.

FIG. 3 is an exemplary optical fiber including subsections of repeating groups of fiber sensors.

DETAILED DESCRIPTION

Figure 4:
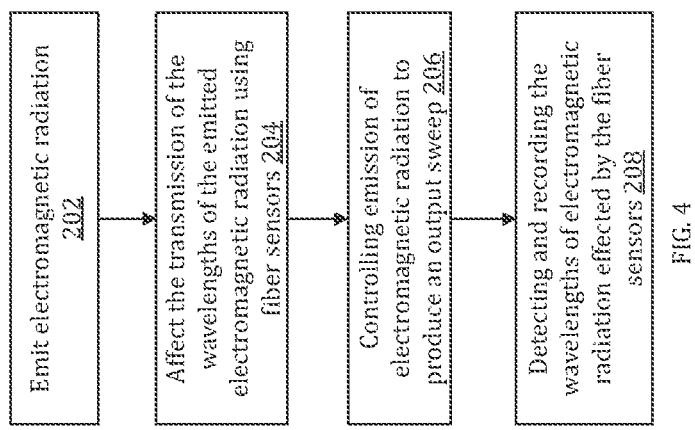
FIG. 4 is a flow diagram for a method for discriminately measuring the response of a plurality of spatially separated fiber sensors positioned along an optical fiber.

The present disclosure provides a system and method for discriminately measuring the response of a plurality of spatially separated fiber sensors positioned along an optical fiber using a sweep of electromagnetic radiation. Each fiber sensor affects the transmission of a particular wavelength of electromagnetic radiation and the particular wavelength affected by a given fiber sensor is dependent on at least one environmental property of the given fiber sensor. By detecting the particular wavelength affected by a given sensor, it is possible to determine the environmental property of the given sensor.

A system 10 in accordance with aspects of the present disclosure is illustrated in FIG. 1A. The system 10 includes a source of electromagnetic radiation 12, an optical fiber 16, a plurality of fiber sensors 18a-c, a controller 20, and a detector 22. The controller controls the electromagnetic radiation output by the source 12. Electromagnetic radiation emitted by the source 12 is transmitted by the optical fiber 16, where the electromagnetic radiation interacts with the fiber sensors 18a-c. The fiber sensors 18a-c exhibit a wavelength-dependent response to a stimulus. That is, the fiber sensors 18a-c are configured to affect a particular wavelength of light that depends on the environmental properties experienced by the fiber sensors 18a-c. The detector is configured to detect the particular wavelengths of light effected by the fiber sensor 18a-c.

The system 10 may also include a circulator 14 and a processing device 24. The circulator 14 may be configured to receive electromagnetic radiation and pass the received electromagnetic radiation onto the next port of the circulator 14. The circulator 14 passes the electromagnetic radiation emitted by the source 12 to the optical fiber 16. Similarly, the electromagnetic radiation returning from the optical fiber 16 (due to the fiber sensors 18a-c) may also be passed to the detector 22 via the circulator 14. The processing device 24 is configured to determine the detected particular wavelength effected by each fiber sensor 18 based on known properties of the system 10. Based on this information, the processing device 24 determines the environment properties experienced by the fiber sensor 18a-c.

Turning to FIG. 2A, the electromagnetic radiation source 12 is configured to emit electromagnetic radiation having a wavelength within an emission wavelength range 110. An exemplary emission wavelength 110 range is from 1520 nm to 1600 nm. However, one of ordinary skill in the art will readily appreciate that the emission wavelength range 110 may comprise other wavelengths and wavelength ranges.

As shown in FIG. 1B, the electromagnetic radiation source 12 may comprise a tunable laser. The tunable laser may be a swept laser source, a Semiconductor Monolithic Tunable Laser Source (SMTLS), a Vernier-Tuned Distributed Bragg Reflector laser, a tunable VCSEL, or any other suitable tunable laser source.

The term "swept" or "sweep", as used herein, refers to the source 12 outputting a wavelength of electromagnetic radiation at one time point. The term wavelength, as used herein, may be used to refer to a discrete wavelength or range of wavelengths. The wavelength output by the laser source is changed as time progresses from one wavelength to another wavelength. The wavelength output by the laser source is changed over time to encompass a range of wavelengths.

The source 12 may be coupled (directly or indirectly) to the optical fiber 16 such that the emitted electromagnetic radiation is transmitted by the optical fiber 16, which includes the plurality of fiber sensors 18. Each fiber sensor 18 affects a transmission of a particular wavelength 114 of the electromagnetic radiation transmitted by the optical fiber. The particular wavelength 114 affected by a given fiber sensor 18 is dependent on at least one environmental property of the given fiber sensor 18. Also, the particular wavelength 114 affected by the given fiber sensor 18 is constrained within a defined subrange 112 of the emission wavelength range 110. Each fiber sensor 18 may affect the transmission of the particular wavelength 114 by reflecting the particular wavelength 114.

FIGS. 2A and 2B depict exemplary particular wavelengths 114a-f effected by the fiber sensor 18 and defined subranges 112a-f for six fiber sensors 18, respectively. In this example, there are six defined subranges 112a-f for the fiber sensors 18 that span the emission wavelength range 110. As shown in the figures, the particular wavelength 114a-f effected by each fiber sensor 18 falls within the defined subrange 112a-f for each fiber sensor 18. As described above, where the particular wavelength 114 effected by the fiber sensor 18 falls within the subrange 112 is dependent upon the environmental properties experienced by the optical fiber 16. For example, for a given fiber sensor 18, the defined subrange 112 maybe from 1520-1524 nm. In this example, the given fiber sensor 18 may be calibrated such that the pressure experienced by the given fiber sensor 18 determines the affected particular wavelength 114. The results of this calibration may be used to determine the pressure at the given fiber sensor 18 based on the detected particular wavelength 114 effected (e.g., reflected) by the given fiber sensor 18.

The plurality of fiber sensors may be Fiber Brag Gratings (FBGs). A FBG is a type of distributed Bragg reflector constructed in a short segment of optical fiber that reflects particular wavelengths of light and transmits other wavelengths. An FBG may be generated by creating a periodic variation in the refractive index of a fiber core of an optical fiber, which generates a wavelength specific dielectric mirror. A FBG reflects a specific wavelength that is sensitive to environment conditions like temperature, pressure, and strain. In this way, FBG's may be used to monitor changes in environmental conditions (e.g., external stimuli) through the change in the reflected wavelength.

As will be understood by one of ordinary skill in the art, the fiber sensors 18 are not limited to FBGs, but may be any suitable component capable of affecting the transmission of electromagnetic radiation based on environmental properties (i.e., external stimuli). For example, the fiber sensor 18 may be configured such that the presence of particular molecules changes the particular wavelength reflected by the fiber sensor 18. In another example, the fiber sensor 18 changes the particular wavelength reflected based on the concentration of a specific molecule.

As described above, the controller 20 is configured to control the electromagnetic radiation output by the electromagnetic radiation source 12. The output of the source 12 is controlled such that, at a given time, the electromagnetic radiation source 12 outputs a specified wavelength of electromagnetic radiation. The specified wavelength output by the source 12 is varied in time to produce an output sweep 120 within the emission wavelength range 110.

As will be understood by one of ordinary skill in the art, the controller 20 may have various implementations. For example, the controller 20 may be separate from or a part of the electromagnetic radiation source 12. The controller 20 may include a processor or any other suitable device, such as a programmable circuit, integrated circuit, memory and I/O circuits, an application specific integrated circuit, microcontroller, complex programmable logic device, other programmable circuits, or the like. The controller 20 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor.

FIG. 2D depicts an exemplary output sweep 120. The output sweep 120 includes at least two repetitions 122 of a combination of a subsweep 124 followed by a pause 126. Each subsweep 124 may be designed to include wavelengths of electromagnetic radiation that include the defined subrange 114 of at least one fiber sensor 18. Each pause 126 may be designed to allow sufficient time for particular wavelengths 114 of electromagnetic radiation from the previous subsweep 124 to interact with the fiber sensor 18 and return to the detector 22. For this reason, the pause wavelength for each subsweep may be set to not fall within the defined subrange 114 of any of the fiber sensors 18.

Each of the repetitions 122 begins at an initial wavelength 128 and ends at an ending wavelength 130. Each subsweep 124 comprises a sweep across a range of wavelengths beginning with the initial wavelength 128 and ending at the ending wavelength 130. For example, as shown in FIG. 2D, each subsweep 124 may be a linear sweep from the initial wavelength 128 to the ending wavelength 130. However, as will be understood by one of ordinary skill in the art, each subsweep 124 may be nonlinear (e.g., parabolic, etc.) and each subsweep 124 may have a different profile (e.g., one subsweep may be linear and the next subsweep may be nonlinear).

During each pause 126 following the subsweep 124, the wavelength of the electromagnetic radiation output by the electromagnetic radiation source 12 is maintained for a period of time at a pause wavelength.

As shown in FIG. 2D, within a particular subsweep 124, the pause wavelength may be the same as (or approximately equal to) the ending wavelength 130 of the particular subsweep 124. The ending wavelength 130 for a preceding subsweep 124 that immediately precedes a following subsweep 124 may be the initial wavelength 128 for the following subsweep 124. That is, the pause wavelength may be approximately equal to the ending wavelength 130 of the preceding subsweep 124 and/or the pause wavelength may be approximately equal to the initial wavelength 130 for a following subsweep 124. As an example, approximately equal may refer to the pause wavelength differing from the ending wavelength 130 by 1-5 nm or 5-10 nm. Similarly, maintaining the output of the source 12 at the pause wavelength may refer to the output of the source 12 being held approximately constant. That is, if the pause wavelength is 1550 nm, then maintaining the output of the source 12 may refer to the source 12 outputting electromagnetic radiation within a range of +/−1 nm, +/−2 nm, +/−3 nm, or +/−5 nm of the pause wavelength.

With further reference to FIG. 2D, for each repetition of the subsweep 126, the initial wavelengths are not the same and the ending wavelengths are not the same. That is, the initial wavelength 128 for a first subsweep 124 differs from the initial wavelength 128 for the next subsweep 124. Similarly, the ending wavelength 130 for a first subsweep 124 differs from the ending wavelength 130 for the next subsweep 124. In FIG. 2D, the ending wavelength 130 for a preceding subsweep 124 is approximately equal to the initial wavelength 128 for a following subsweep 124. In this way, the output sweep 120 increases from the initial wavelength 128 of the first repetition 122 of the subsweep to the ending wavelength 130 of the final repetition 122 of the subsweep in the output sweep 120. While the depicted examples show the output sweep 120 increasing in wavelength with time, as will be understood by one of ordinary skill in the art, the output sweep 120 is not required to do so and may, e.g., instead decrease in wavelength with time.

The output sweep 120 begins at a starting wavelength 132 and ends at a final wavelength 134. The output sweep 120 may be repeated at least once such that, following completion of the output sweep 120, the wavelength of the electromagnetic radiation output by the electromagnetic radiation source 12 switches from the final wavelength 134 to the starting wavelength 132. In this way, the output sweep 120 may be repeated to continuously measure the response of the fiber sensors 18. While FIG. 2D depicts the output sweep 120 as transitioning directly from the final wavelength 134 to the starting wavelength 132, the transition from the final wavelength 134 to the starting wavelength 132 may take any shape. For example, the transition may have a parabolic shape including wavelengths between.

As described above, the system 10 also includes a detector 22. The detector is configured to detect wavelengths 140 of the electromagnetic radiation effected by the fiber sensors 18. The detector 22 is configured to record the detected effected wavelengths 140 and a time at which each effected wavelength 140 was detected.

Turning to FIG. 3, an exemplary optical fiber 16 is shown. The optical fiber 16 is composed of repeating subsections 142 that include the same repeating sets of fiber sensors 18. The defined subrange 112 for each particular fiber sensor 18 within a given set of the repeating sets of fiber sensors (i.e., within a given subsection 142) does not overlap with the defined subrange of any other fiber sensors within the given set (i.e., within the given subsection 142). That is, within a subsection 142, the possible wavelengths effected by the different fiber sensor 18 do not overlap. The repeating sets of fiber sensors 18 may be equally spaced along the optical fiber 16.

Turning to FIGS. 2E and 2F, exemplary detected wavelengths 114 are shown. These figures depict the timing of the subsweep 124 and pause 126 below the time axis.

The exemplary detected wavelengths 114 shown in FIG. 2E are the result of controlling source 12 such that each of the subsweeps 124 of the output sweep 120 overlaps with the defined subrange 112 of a single fiber sensor 18 in each of the subsections 142a-d of the optical fiber 16 shown in FIG. 3. That is, the source 12 outputs an output sweep 120 in which a single fiber sensor 18 in each subsection 142 of the optical fiber 16 affects the wavelengths of electromagnetic radiation in a given subsweep 122. For example, assume the first fiber sensors 18a in each subsection 142 (FIG. 3) has a defined subrange 112 of 1520-1524 nm and each of the other fiber sensors 18b-h in each section have a defined subrange that begins at greater 1526 nm. If the first subsweep 128 of the output sweep 120 is from 1520-1525 nm, then only the first fiber sensor 18a in each subsection 142 of the optical fiber 16 will affect the electromagnetic radiation transmitted by the optical fiber 16. The source 12 can be controlled to generate an output sweep 120 in which each subsweep 124 includes wavelengths that fall within the subrange 112 for one (in some examples only one) of the fiber sensors 18a-h in each subsection 142 of the optical fiber 16. FIG. 2E depicts such an example.

In FIG. 2E, the particular effected wavelengths 114 detected by the detector 22 are shown. As described above, in this example, the particular wavelengths 114 effected by, e.g., the first fiber sensor 18a in each subsection 142 of the optical fiber 16 are first detected. Next, the particular wavelength 114 effected by, e.g., the second fiber sensor 18b in each subsection 142 are detected. This process continues for each fiber sensor 18 in each subsection 142.

While in FIG. 2E the source 12 is driven such that each subrange 112 only overlapped with the defined subrange 112 for a single fiber sensor 18 in each subsection 142 of the optical fiber 16, in FIG. 2F the source 12 is driven such that each subrange 112 overlaps with the defined subrange 112 of two fiber sensors 18 in each subsection 142 of the optical fiber 16. That is, as shown in FIG. 2F, the particular wavelengths 114 effected by the first and second fiber sensors 18a, 18b are contained with a single subsweep. For this reason, the particular wavelengths effected 114 by the first and second fiber sensors 18a,b of the first subsection 142 are detected prior to receiving the particular wavelengths effected 114 by the first and second fiber sensors 18a,b of the second subsection 142. The exemplary detected wavelengths 114 in FIG. 2F are for an optical fiber 16 containing two subsections 142.

A person of ordinary skill in the art will readily appreciate that the detector 22 may comprise any device suitable for measuring or quantifying electromagnetic radiation (e.g., light) incident on the detector 22. For example, the detector 14 may comprise an image sensor, CCD sensor, or CMOS sensor. Additionally, the detector 22 may include the capability for measuring separately the intensity of different wavelengths of electromagnetic radiation. For example, the detector 22 may include a spectrometer or wavelength separator capable of differentiating between different wavelengths of electromagnetic radiation.

In both FIG. 2E and FIG. 2F, a processing device 24 may be used to analyze the particular effected wavelengths 114 detected by the detector 22. The processing device 24 is configured to determine the at least one environmental property of a selected fiber sensor 18 of the plurality of sensors 18 based on the particular wavelength 114 effected by the selected fiber sensor 18. The processing device 24 is configured to determine the particular wavelength effected by the selected fiber sensor 18 based on known properties of the optical fiber 16, including the location of the plurality of fiber sensors alone the optical fiber 16, known properties of the fiber sensors 18, known properties of the output sweep 120, and the timing at which the detected effected wavelengths 114 are detected.

The processing device 24 may also be configured to determine the at least one environmental property of each of the plurality of sensors 18.

For example, by using the wavelength of the detected effected wavelengths 114, the processing device 24 may determine which fiber sensor 18 effected the detected wavelength 114. However, it may not be possible to determine which subsection 142 the fiber sensor 18 was located in using wavelength alone. But, by analyzing the timing at which the effected wavelengths 114 are detected and the known distance that the different subsections 142 are located from the detector, it is possible to determine which subsection 142 the fiber sensor 18 is located in. As an example, if the first fiber sensor 18 in each subsection 142 affects an electromagnetic radiation range of 1520-1524 nm, then the second effected wavelength detected in this range may be determined as coming from the first fiber sensor 18 in the second subsection 142 of the optical fiber 16. The fiber sensor 18 determined to be associated with each detected effected wavelength 114 may also be determined based on the time it should take for electromagnetic radiation to travel from the source 12 to the fiber sensor 18 and back to the detector. This may be determined using the speed of light, the index of refraction of the optical fiber 16, and the known locations of the fiber sensor 18 along the optical fiber 16.

As will be understood by one of ordinary skill in the art, the processing device 24 may have various implementations. For example, the processing device 24 may be separate from or a part of the detector 22. Alternatively, as shown in FIG. 1B, the controller 20 and processing device 24 may be part of a control device 26. The processing device 24 may include a processor or any other suitable device, such as a programmable circuit, integrated circuit, memory and I/O circuits, an application specific integrated circuit, microcontroller, complex programmable logic device, other programmable circuits, or the like. The processing device 24 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor.

The processing device 24 may additionally include a data acquisition system capable of receiving input from the detector 22.

The at least one environmental property may be, e.g., at least one of temperature, pressure, strain, a presence of specific substances, or a concentration of particular substances.

The known locations of the fiber sensor 18 may be used to determine the period of time to be used for each pause 126 in the output sweep 120. For example, the period of time of the pause following each subsweep may be greater than or equal to 2 nL/c, where n is the index of refraction of the optical fiber, c is the speed of light, and L is the distance between the beginning of a particular one of the repeating sets of fiber sensors to an adjacent one of the repeating sets of fiber sensors. A sweep rate for each subsweep 124 may be set to be greater than (2* dλ_sensor_max +dλ_sub) / Tsec, where Tsec is the period of time of the pause, dλ_sensor_max is the defined subrange, and dλ_sub is difference between the ending wavelength and the initial wavelength for each subsweep.

As shown in FIG. 1C, the source 12 may comprise a broadband electromagnetic radiation source. In this embodiment, broadband electromagnetic radiation is output by the source 12 as opposed to an output sweep 12 along a range of wavelengths. This embodiment additionally includes a wavelength separator 30 (e.g., spectrometer) in order to spectrally separated the particular effected wavelengths 114. The spectrally separated electromagnetic radiation is output by the wavelength separator 30 and detected by the detector 22. In this embodiment, the detector 22 may comprise an array of photoreceivers or a linear array. In this way, the system 10 may sequentially read the intensity of specific wavelength ranges.

In this embodiment, the processor 24 may determine which fiber sensor 18 effects each wavelength 114 in the same manner described above.

With reference to FIG. 4, a block diagram depicting a method for discriminately measuring the response of a plurality of spatially separated fiber sensors 18 positioned along an optical fiber 16 using a sweep of electromagnetic radiation is shown. The method may be performed by the at least one controller 20, detector, or processing device 24.

In process block 202, electromagnetic radiation is emitted. The emitted electromagnetic radiation has a wavelength within an emission wavelength range, such that the emitted electromagnetic radiation is transmitted by the optical fiber. As described above, the electromagnetic radiation may be emitted by the source 12.

In process block 204, the transmission of at least one wavelength of the electromagnetic radiation transmitted by the optical fiber 16 is affected by the fibers sensors 18. Each fiber sensor 18 affects a transmission of a particular wavelength of the electromagnetic radiation. For a given fiber sensor 18 of the plurality of fiber sensors 18, the particular wavelength 114 affected by the given fiber sensor 18 is dependent on at least one environmental property of the given fiber sensor 18. The particular wavelength affected by the given fiber sensor 18 is constrained within a defined subrange 112 of the emission wavelength range 120.

In process block 206, the emission of electromagnetic radiation is controlled, such that at a given time, a specified wavelength of electromagnetic radiation is emitted. In process block 208, the specified wavelength in varied in time to produce an output sweep 120 within the emission wavelength range 110. The output sweep 120 includes at least two repetitions 122 of a combination of a subsweep 124 followed by a pause 126. Each of the repetitions 122 begins at an initial wavelength 128 and ends at an ending wavelength 130. Each subsweep 124 comprises a sweep across a subrange of wavelengths beginning with the initial wavelength 128 and ending at the ending wavelength 130. During each pause 126 following the subsweep 124, the wavelength of the electromagnetic radiation being emitted is maintained for a period of time at a pause wavelength. The initial wavelength 128 differs for each repetition of the subsweep 124 and the ending wavelength 130 differs for each repetition of the subsweep 124.

In process block 208, wavelengths of the electromagnetic radiation effected by the fiber sensors 18 are detected. The effected wavelengths and a time at which each effected wavelength was detected is recorded.

Illustrative embodiments of a disclosure are disclosed herein. One of ordinary skill in the art will readily recognize that the disclosure may have other applications in other environments. In fact, many embodiments and implementations are possible. The following claims are in no way intended to limit the scope of the present disclosure to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Although the disclosure is shown and described with respect to illustrative embodiments, it is evident that equivalents and modifications will occur to those persons skilled in the art upon the reading and understanding hereof. The present disclosure includes all such equivalents and modifications and is limited only by the scope of the claims if appended hereto.

What is claimed is:

1. A system for discriminately measuring the response of a plurality of spatially separated fiber sensors positioned along an optical fiber, the system comprising:
   an electromagnetic radiation source configured to emit electromagnetic radiation having a wavelength within an emission wavelength range, wherein the emitted electromagnetic radiation is transmitted by the optical fiber;
   the optical fiber including the plurality of fiber sensors, wherein:
      each fiber sensor affects a transmission of a particular wavelength of the electromagnetic radiation transmitted by the optical fiber; and
      for a given fiber sensor of the plurality of fiber sensors:
         the particular wavelength affected by the given fiber sensor is dependent on at least one environmental property of the given fiber sensor; and
         the particular wavelength affected by the given fiber sensor is constrained within a defined subrange of the emission wavelength range;
   a controller configured to control the electromagnetic radiation output by the electromagnetic radiation source, such that:
      at a given time, the electromagnetic radiation source outputs a specified wavelength of electromagnetic radiation; and
      the specified wavelength is varied in time to produce an output sweep within the emission wavelength range, wherein:
         the output sweep includes at least two repetitions of a combination of a subsweep followed by a pause;
         each of the repetitions begins at an initial wavelength and ends at an ending wavelength;
         each subsweep comprises a sweep across a subrange of wavelengths beginning with the initial wavelength and ending at the ending wavelength;

during each pause following the subsweep, the wavelength of the electromagnetic radiation output by the electromagnetic radiation source is maintained for a period of time at a pause wavelength; and the initial wavelength differs for each repetition of the subsweep and the ending wavelength differs for each repetition of the subsweep; and a detector configured to detect wavelengths of the electromagnetic radiation effected by the fiber sensors, wherein the detector is configured to record the detected effected wavelengths and a time at which each effected wavelength was detected.

2. The system of claim 1, wherein the plurality of fiber sensors are fiber brag gratings (FBGs).

3. The system of claim 1, wherein within a particular subsweep the pause wavelength is the ending wavelength of the particular subsweep.

4. The system of claim 1, wherein the pause wavelength for each subsweep does not fall within the defined subrange of any of the fiber sensors.

5. The system of claim 1, wherein the ending wavelength for a preceding subsweep that immediately precedes a following subsweep is the initial wavelength for the following subsweep.

6. The system of claim 1, wherein the optical fiber is comprised of repeating sets of fiber sensors.

7. The system of claim 6, wherein the defined subrange for each particular fiber sensor within a given set of the repeating sets of fiber sensors does not overlap with the defined subrange of any other fiber sensors within the given set.

8. The system of claim 6, wherein:
the repeating sets of fiber sensors are equally spaced along the optical fiber; and
the period of time of the pause following each subsweep is greater than or equal to 2 nL/c, where n is the index of refraction of the optical fiber, c is the speed of light, and L is the distance between the beginning of a particular one of the repeating sets of fiber sensors to an adjacent one of the repeating sets of fiber sensors.

9. The system of claim 1, wherein a sweep rate for each subsweep is greater than $(2*d\lambda\_sensor\_max+d\lambda\_sub)/Tsec$, where Tsec is the period of time of the pause, $d\lambda\_sensor\_max$ is the defined subrange, and $d\lambda\_sub$ is difference between the ending wavelength and the initial wavelength for each subsweep.

10. The system of claim 1, wherein:
the output sweep begins at a starting wavelength and ends at a final wavelength; and
the output sweep is repeated at least once such that, following completion of the output sweep, the wavelength of the electromagnetic radiation output by the electromagnetic radiation source switches from the final wavelength to the starting wavelength.

11. The system of claim 1, further comprising a processing device configured to determine the at least one environmental property of a selected fiber sensor of the plurality of sensors based on the particular wavelength affected by the selected fiber sensor.

12. The system of claim 11, wherein the processing device is further configured to determine the particular wavelength effected by the selected fiber sensor based on known properties of the optical fiber including location of the plurality of fiber sensors, known properties of the fiber sensors, known properties of the output sweep, and the timing at which the detected effected wavelengths were detected.

13. The system of claim 11, wherein the processing device is configured to determine the at least one environmental property of each of the plurality of sensors.

14. The system of claim 1, wherein the at least one environmental property is at least one of temperature, pressure, strain, a presence of specific substances, or a concentration of particular substances.

15. The system of claim 1, wherein the each fiber sensor affects the transmission of the particular wavelength by reflecting the particular wavelength.

16. The system of claim 1, wherein the electromagnetic radiation source is a tunable laser.

17. A method for discriminately measuring the response of a plurality of spatially separated fiber sensors positioned along an optical fiber, the method comprising:
emitting electromagnetic radiation having a wavelength within an emission wavelength range, such that the emitted electromagnetic radiation is transmitted by the optical fiber;
affecting a transmission of at least one wavelength of the electromagnetic radiation transmitted by the optical fiber using the fibers sensors, wherein:
each fiber sensor affects a transmission of a particular wavelength of the electromagnetic radiation;
for a given fiber sensor of the plurality of fiber sensors:
the particular wavelength affected by the given fiber sensor is dependent on at least one environmental property of the given fiber sensor;
the particular wavelength affected by the given fiber sensor is constrained within a defined subrange of the emission wavelength range;
controlling the emission of electromagnetic radiation, such that at a given time, a specified wavelength of electromagnetic radiation is emitted;
varying in time the specified wavelength to produce an output sweep within the emission wavelength range, wherein:
the output sweep includes at least two repetitions of a combination of a subsweep followed by a pause;
each of the repetitions begins at an initial wavelength and ends at an ending wavelength;
each subsweep comprises a sweep across a subrange of wavelengths beginning with the initial wavelength and ending at the ending wavelength;
during each pause following the subsweep, the wavelength of the electromagnetic radiation being emitted is maintained for a period of time at a pause wavelength; and
the initial wavelength differs for each repetition of the subsweep and the ending wavelength differs for each repetition of the subsweep; and
detecting wavelengths of the electromagnetic radiation effected by the fiber sensors and recording the effected wavelengths and a time at which each effected wavelength was detected.

18. The method of claim 17, further comprising determining the at least one environmental property of a selected fiber sensor of the plurality of sensors based on the particular wavelength affected by the selected fiber sensor.

19. The method of claim 18, further comprising determining the particular wavelength effected by the selected fiber sensor based on known properties of the optical fiber including location of the plurality of fiber sensors, known properties of the fiber sensors, known properties of the output sweep, and the timing at which the detected effected wavelengths were detected.

20. A system for discriminately measuring the response of a plurality of spatially separated fiber sensors positioned along an optical fiber, the system comprising:
- an electromagnetic radiation source configured to emit electromagnetic radiation having a wavelength within an emission wavelength range, wherein the emitted electromagnetic radiation is transmitted by the optical fiber;
- the optical fiber including the plurality of fiber sensors, wherein:
  - the optical fiber is comprised of repeating sets of fiber sensors;
  - each fiber sensor affects a transmission of a particular wavelength of the electromagnetic radiation transmitted by the optical fiber;
  - for a given fiber sensor of the plurality of fiber sensors:
    - the particular wavelength affected by the given fiber sensor is dependent on at least one environmental property of the given fiber sensor; and
    - the particular wavelength affected by the given fiber sensor is constrained within a defined subrange of the emission wavelength range; and
  - the defined subrange for each particular fiber sensor within a given set of the repeating sets of fiber sensors does not overlap with the defined subrange of any other fiber sensors within the given set;
- a controller configured to control the electromagnetic radiation output by the electromagnetic radiation source, such that:
  - at a given time, the electromagnetic radiation source outputs a specified wavelength of electromagnetic radiation; and
  - the specified wavelength is varied in time to produce an output sweep within the emission wavelength range, wherein:
    - the output sweep includes at least two repetitions of a combination of a subsweep followed by a pause;
    - each of the repetitions begins at an initial wavelength and ends at an ending wavelength;
    - each subsweep comprises a sweep across a subrange of wavelengths beginning with the initial wavelength and ending at the ending wavelength;
    - the ending wavelength for a preceding subsweep that immediately precedes a following subsweep is the initial wavelength for the following subsweep;
    - during each pause following the subsweep, the wavelength of the electromagnetic radiation output by the electromagnetic radiation source is maintained for a period of time at a pause wavelength;
    - within a particular subsweep the pause wavelength is the ending wavelength of the particular subsweep;
    - the pause wavelength for each subsweep does not fall within the defined subrange of any of the fiber sensors; and
    - the initial wavelength differs for each repetition of the subsweep and the ending wavelength differs for each repetition of the subsweep; and
- a detector configured to detect wavelengths of the electromagnetic radiation effected by the fiber sensors, wherein the detector is configured to record the detected effected wavelengths and a time at which each effected wavelength was detected.

* * * * *